US008739055B2

(12) United States Patent
Coddington

(10) Patent No.: US 8,739,055 B2
(45) Date of Patent: May 27, 2014

(54) CORRECTION OF TYPOGRAPHICAL ERRORS ON TOUCH DISPLAYS

(75) Inventor: Nicole Coddington, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 466 days.

(21) Appl. No.: 12/437,391

(22) Filed: May 7, 2009

(65) Prior Publication Data

US 2010/0287486 A1 Nov. 11, 2010

(51) Int. Cl.
*G06F 3/048* (2013.01)

(52) U.S. Cl.
USPC ........... 715/769; 715/863; 715/864; 715/257; 715/773

(58) Field of Classification Search
CPC .......................... G06F 3/0486; G06F 3/04883
USPC .................... 715/769, 863, 864, 257, 773
See application file for complete search history.

(56) References Cited

U.S. PATENT DOCUMENTS

| 6,128,007 | A * | 10/2000 | Seybold ........................ 345/179 |
| 6,664,982 | B1 * | 12/2003 | Bi .................................. 715/773 |
| 6,692,170 | B2 | 2/2004 | Abir |
| 7,030,863 | B2 | 4/2006 | Longe et al. |
| 2005/0283726 | A1 * | 12/2005 | Lunati ........................... 715/533 |
| 2006/0085757 | A1 | 4/2006 | Andre et al. |
| 2006/0224586 | A1 * | 10/2006 | Pickover et al. .................. 707/6 |
| 2007/0266324 | A1 * | 11/2007 | Chailleux ..................... 715/730 |
| 2007/0273658 | A1 * | 11/2007 | Yli-Nokari et al. ........... 345/173 |
| 2008/0155439 | A1 * | 6/2008 | Stern et al. ..................... 715/769 |
| 2008/0182599 | A1 * | 7/2008 | Rainisto et al. ............... 455/466 |
| 2008/0316183 | A1 | 12/2008 | Westerman et al. |
| 2009/0089666 | A1 * | 4/2009 | White et al. ................... 715/257 |
| 2009/0225034 | A1 * | 9/2009 | Kida et al. ..................... 345/171 |
| 2009/0225042 | A1 * | 9/2009 | Andrews et al. .............. 345/173 |
| 2009/0249232 | A1 * | 10/2009 | Lundy et al. .................. 715/764 |
| 2009/0273571 | A1 * | 11/2009 | Bowens ......................... 345/173 |

OTHER PUBLICATIONS

"Keyboard—Definition and More from the Free Merriam-Webster Dictionary.pdf", archived by the Wayback Machine on Dec. 8, 2008, retrieved Oct. 19, 2012 from http://web.archive.org/web/20081205024528/http://merriam-webster.com/dictionary/keyboard.*
"Motomanual", Retrieved at <<http://www.motorola.com/Hellomoto/Master%20Lists/Product%20Manuals/Static%20Files/US-EN/MotoMing%20User%20Guide.pdf>>, pp. 1-174.

(Continued)

*Primary Examiner* — Kieu Vu
*Assistant Examiner* — Aaron Lowenberger
(74) *Attorney, Agent, or Firm* — John Jardine; Andrew Sanders; Micky Minhas

(57) ABSTRACT

Various embodiments related to the correction of typographical errors on touch displays are disclosed. One disclosed embodiment includes a portable computing device comprising a touch-sensitive display device, a logic subsystem, and memory comprising instructions executable by the logic subsystem to perform a method of correcting typographical errors displayed on the touch-sensitive display device. The instructions are executable to identify a typographical error within text displayed on the display, and upon identifying the typographical error, highlight on the display the typographical error. The instructions are further executable to detect a gesture-based touch input selecting a text replacement for correcting the typographical error, and, upon detecting the gesture-based touch input, if a release of the gesture-based touch input is detected within a predefined region associated with a location of the typographical error, then display on the display a replacement of the typographical error with the text replacement.

18 Claims, 6 Drawing Sheets

(56) References Cited

OTHER PUBLICATIONS

"Virtual On-Screen Keyboard for any Taste", Retrieved at <<http://hot-virtual-keyboard.com/>>, Nov. 10, 2008, pp. 1-3.

Aziz, Abdul., "PocketCM: iPhone Like Touchscreen SIP Virtual Keyboard for Windows Mobile 6 with Custom Words Dictionary & Keywords Suggestion", Retrieved at <<http://thinkabdul.com/2007/08/24/pocketcm-iphone-like-touchscreen-sip-virtual-keyboard-for-windows-mobile-6-with-custom-words-dictionary-keywords-suggestion/>>, Jan. 23, 2009, pp. 1-3.

Marc, Z., "iPhone: First Impressions Part 11", Retrieved at <<http://www.applelinks.com/index.php/print/16483/>>, Jul. 27, 2007, pp. 1-5.

Landau, Ted., "Avoid iPhone Navigation and Typing Hassles", Retrieved at <<http://www.macworld.com/article/131264/2007/12/tco_iphone.html>>, Dec. 29, 2007, pp. 1-6.

* cited by examiner

CORRECTION OF TYPOGRAPHICAL ERRORS ON TOUCH DISPLAYS

BACKGROUND

Touch-sensitive computing devices are becoming increasingly popular, especially on portable computing devices such as portable digital assistants, media players, mobile phones, and the like. Such devices may be configured to detect touch inputs on a touch-sensitive display surface, providing the user with an intuitive interface for interacting with the device. Such touch-sensitive displays may be further configured to display a virtual keyboard for typing text, where the letters of such a keyboard are selected via touch inputs from a user's fingers. A drawback of such virtual keyboards displayed on small devices is that the keys tend to be smaller in size relative to a size of a user's fingertip, and thus touch-typing may result in typographical errors.

SUMMARY

Various embodiments related to correction of typographical errors on touch displays are disclosed herein. One disclosed embodiment includes a portable computing device comprising a touch-sensitive display device, a logic subsystem, and memory comprising instructions executable by the logic subsystem to perform a method of correcting typographical errors displayed on the touch-sensitive display device. For example, the instructions may be executable to identify a typographical error within text displayed on the display, and upon identifying the typographical error, highlight on the display the typographical error. The instructions may be further executable to detect a gesture-based touch input selecting a text replacement for correcting the typographical error, and, upon detecting the gesture-based touch input, if a release of the gesture-based touch input is detected within a predefined region associated with a location of the typographical error, then display on the display a replacement of the typographical error with the text replacement.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present disclosure is related to a portable computing device having a touch-sensitive display capable of detecting touch inputs. Such a display can visually present a virtual keyboard of keys with which a user can actuate via touch inputs (e.g., a finger tap) for typing text. In the case that the portable computing device is physically small, such as a mobile phone or personal digital assistant, such touch-typing commonly results in typographical errors due to the small size of the virtual keyboard. Therefore, as described below in the context of various disclosed embodiments, the portable computing device can be configured to correct such errors via drag-and-drop replacements selected by the user, as described herein. Utilizing touch gestures for text editing may provide a more seamless, and more efficient, natural user interface for the user, in that the user is not interrupted by having to press keys or click through inefficient menus.

Figure 1:
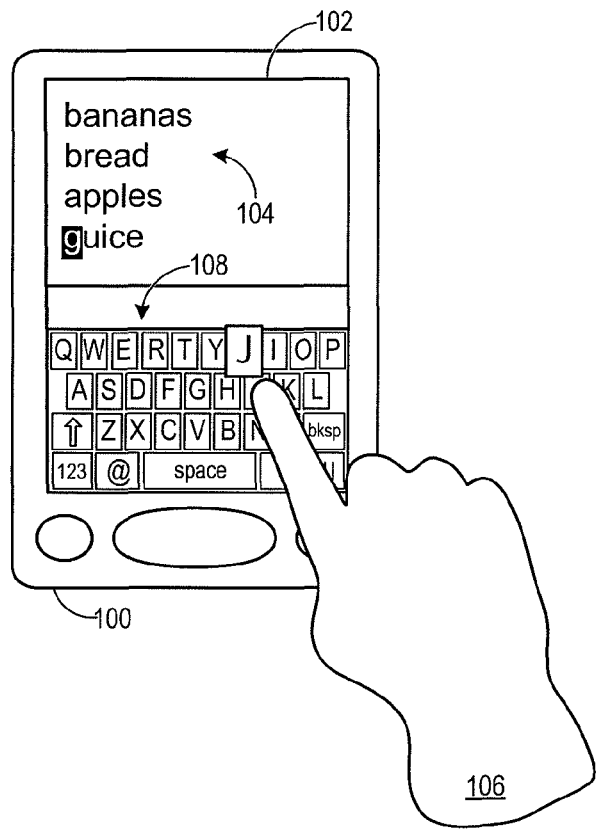
FIG. 1 shows an embodiment of a portable computing device comprising a touch-sensitive display.

An example of such a natural user interface for text editing is illustrated in FIG. 1. As such, example mobile device 100 includes a touch-sensitive display 102 visually presenting text 104 typed by user 106 via virtual keyboard 108. As an example, mobile device 100 has detected a spelling error, which user 106 can correct by dragging-and-dropping, for example, a replacement letter from virtual keyboard 108. The example depicted in FIG. 1 is shown for the purpose of illustration, and it will be understood that such errors may be displayed and corrected in a variety of ways via touch gestures on the touch-sensitive display 102, as described in greater detail hereafter.

Figure 2:
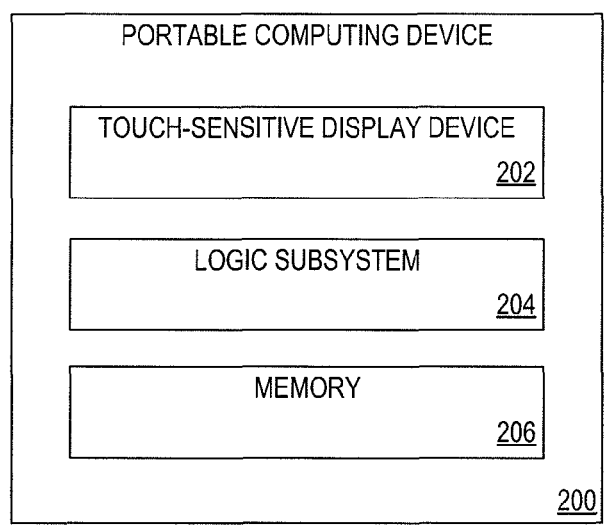
FIG. 2 shows a block diagram of an embodiment of a portable computing device.

FIG. 2 shows another embodiment of an example mobile device, namely a portable computing device 200. As described above, nonlimiting examples of portable computing device 200 may include a mobile phone, a media player, a personal digital assistant and the like. Portable computing device 200 comprises a touch-sensitive display device 202 configured to detect touch inputs. Such a touch-sensitive display device 202 may detect touch inputs in any suitable manner, such as using capacitive detection, optical detection, resistive detection, etc. Such touch inputs may be from a user's finger, a stylus, or any other such implement capable of interacting with touch-sensitive display device 202. Such touch inputs may be in the form of gesture-based touch inputs such as swipe gestures, flick gestures, circular gestures, finger taps, drag-and-drop gestures, press-and-hold gestures, and the like. Further, in the case of touch-sensitive display device 202 being configured to detect multi-touch gestures, such gestures may include a two-finger or three-finger swipe, tap, etc. Such multi-touch gestures may also include pinch gestures of two fingers (or a finger and thumb, etc.) moved towards each other in a "pinching" motion or away from each other in a reverse-pinching motion. Portable computing device 200 further comprises a logic subsystem 204 and memory 206 including instructions executable by logic subsystem 204 to perform one or more of the embodiments of methods of correcting typographical errors displayed on touch-sensitive display device 202, as described herein and discussed in more detail with reference to FIG. 3.

Figure 3:
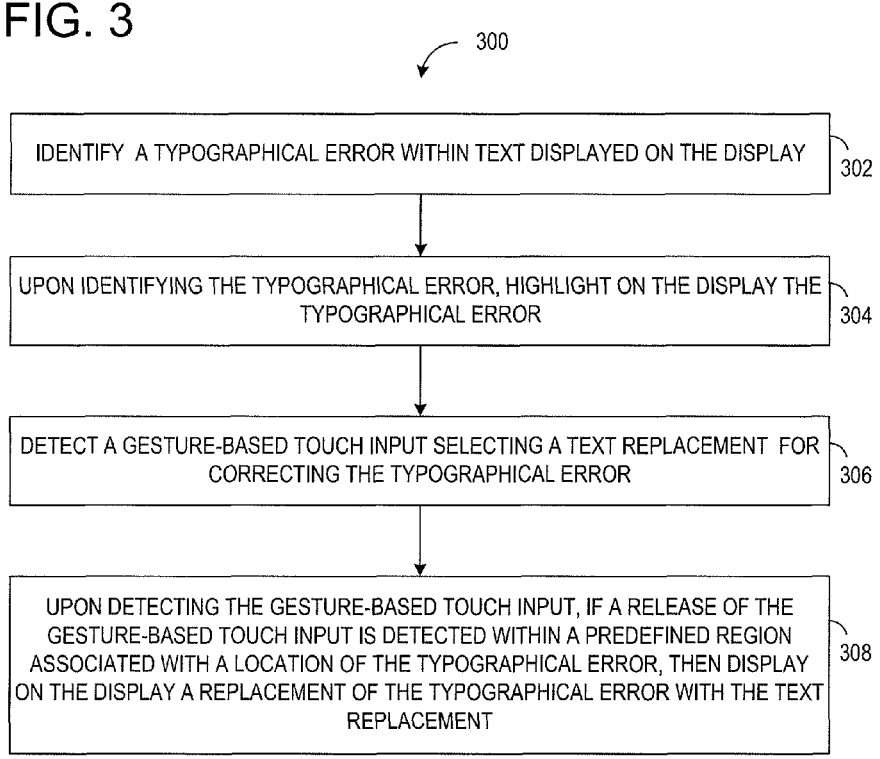
FIG. 3 shows a flow diagram of an embodiment of a method of correcting typographical errors displayed on a touch-sensitive display of a portable computing device.

FIG. 3 shows an embodiment of a method 300 of correcting typographical errors displayed on a touch-sensitive display of a portable computing device. At 302, method 300 includes identifying a typographical error within text displayed on the display. In some cases, such a typographical error may include an error within a word displayed on the display. In other cases, such a typographical error may include a misspelled word displayed on the display. It is to be understood that any other suitable type of typographical error may be displayed, such as transpositions, omissions, wrong key errors, and the like. The typographical error may be identified using any suitable method, such as by applying an intelligence algorithm configured to detect typographical errors. In some cases, identification may occur as part of a larger application, such as a word processor, email client, electronic dictionary, or search engine. In other cases, identification may occur independent of such applications.

Figure 4:
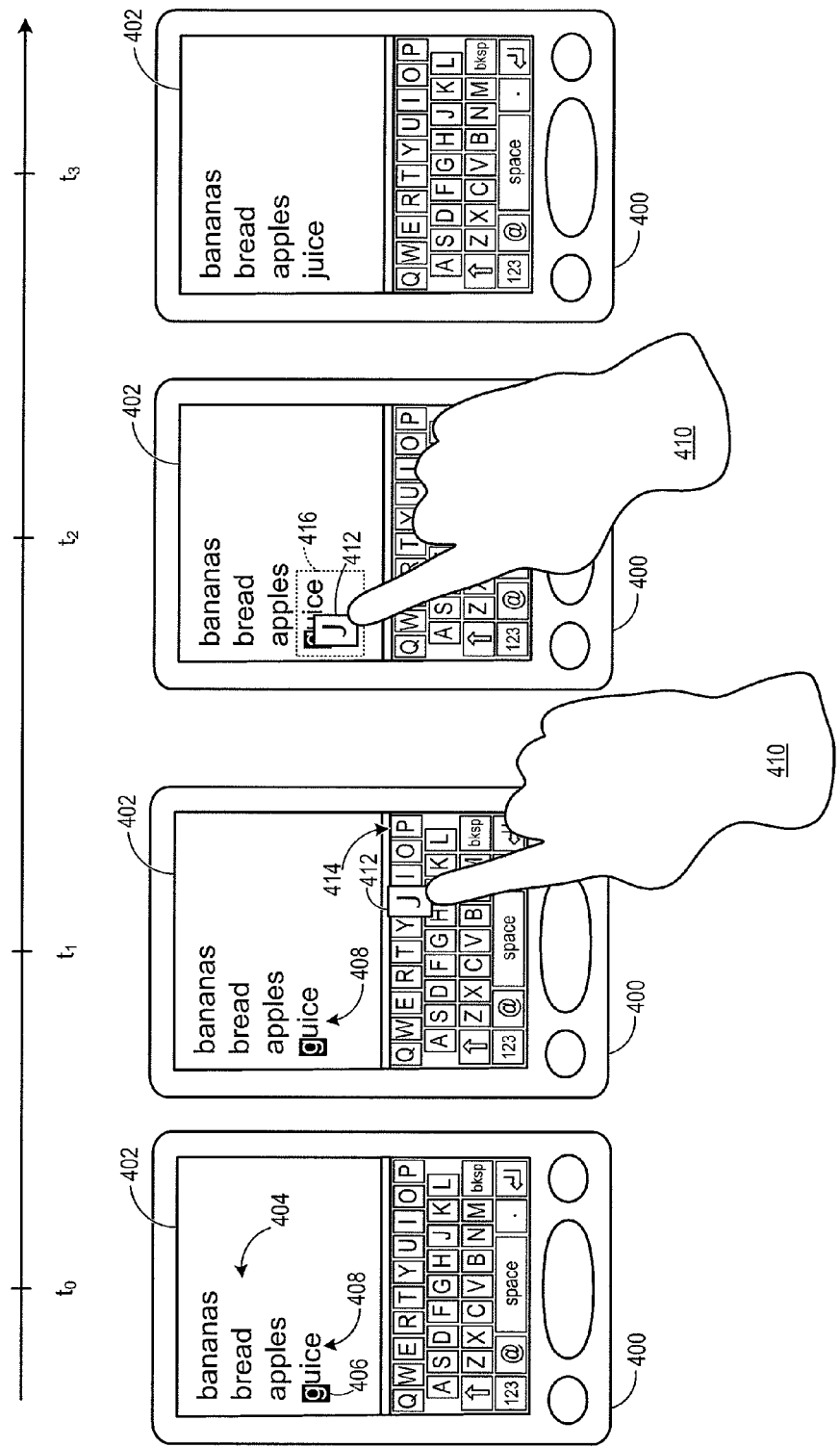
FIG. 4 shows an example time sequence of an embodiment of a method for correcting typographical errors displayed on a touch-sensitive display of a portable computing device.

At 304, method 300 includes upon identifying the typographical error, highlighting on the display the typographical error. Such highlighting may include coloring, shading, underlining, etc. to visually indicate to the user that there is a typographical error. As an example, FIG. 4 shows an embodiment of a mobile device 400 including a touch-sensitive display 402 displaying example text 404 of a grocery list. Text 404 includes a typographical error 406 within word 408. As depicted, at time $t_0$ of the depicted touch sequence, typographical error 406 has been highlighted. It is to be understood that such highlighting is shown for the purpose of example, and that any other suitable type of visual indication may be used to "highlight" the typographical error. As depicted, highlighting may include highlighting a single-letter error. In other cases, highlighting may include highlighting a word. Further, in some embodiments, the typographical error may be highlighted after identifying the typographical error.

Returning to FIG. 3, at 306, method 300 includes detecting a gesture-based touch input selecting a text replacement for correcting the typographical error. As described above, such a gesture-based touch input may include, for example, a touch of a user's finger on the touch-sensitive display. As further described with reference to FIG. 2, the portable computing device and/or touch-sensitive display may be configured to detect such touches by, for example, capacitive detection.

In some embodiments, the text replacement may be a replacement letter selected from a virtual keyboard displayed on the display. As such, detecting the gesture-based touch input selecting the replacement letter from the virtual keyboard may include receiving a touch input over the replacement letter and detecting a movement of the touch input on the display. As an example, at time $t_1$ of FIG. 4, user 410 selects a replacement letter 412 (i.e., the letter "J") from a virtual keyboard 414 displayed on touch-sensitive display 402. As depicted, upon performing a touch-and-hold gesture on letter "J" of virtual keyboard 414, an image of a replacement letter 412 is displayed on display 402.

In some embodiments, a location of the image of the text replacement may be moved in correspondence with the gesture-based touch input. For example, upon selecting the text replacement, a user may perform a drag gesture across the touch-sensitive display such that, in response, the image of the text replacement tracks the motion of the user's drag gesture. In other embodiments, the text replacement may be an entire word, as described in more detail hereafter with reference to FIG. 5.

Returning to FIG. 3, at 308, method 300 next includes upon detecting the gesture-based touch input, if a release of the gesture-based touch input is detected within a predefined region associated with a location of the typographical error, then displaying on the display a replacement of the typographical error with the text replacement. In other words, if the gesture-based touch input is released nearby the typographical error, then the display shows a replacing of the error with the text replacement. For example, at time $t_2$ of FIG. 4, user 410 releases the drag-and-drop gesture over the typographical error within a predefined region 416. In some embodiments, the predefined region may be visually presented on the display (e.g., a dotted line boundary or shading of the region) to visually indicate a location of the predefined region on the display. In other embodiments, the predefined region may not be visually presented on the display. Since the replacement letter 412 was released within a predefined region 416 associated with the location of the typographical error, time $t_3$ of the touch sequence next depicts a replacement of the error, i.e., replacing "g" with "j" to yield a correctly spelled word, "juice."

Returning to FIG. 3, method 300 may further include, upon detecting the gesture-based touch input, if a release of the gesture-based touch input is detected outside of the predefined region associated with the location of the typographical error, then in response, not displaying the replacement of the typographical error with the text replacement For example, a user may have selected the text replacement by mistake. The user may then release the drag-and-drop gesture at a location on the display that is not nearby to the error. Upon doing so, the error may not be replaced, and the image of the replacement text may be removed from the display. Accordingly, the user may then proceed with selecting a different text replacement.

Figure 5:
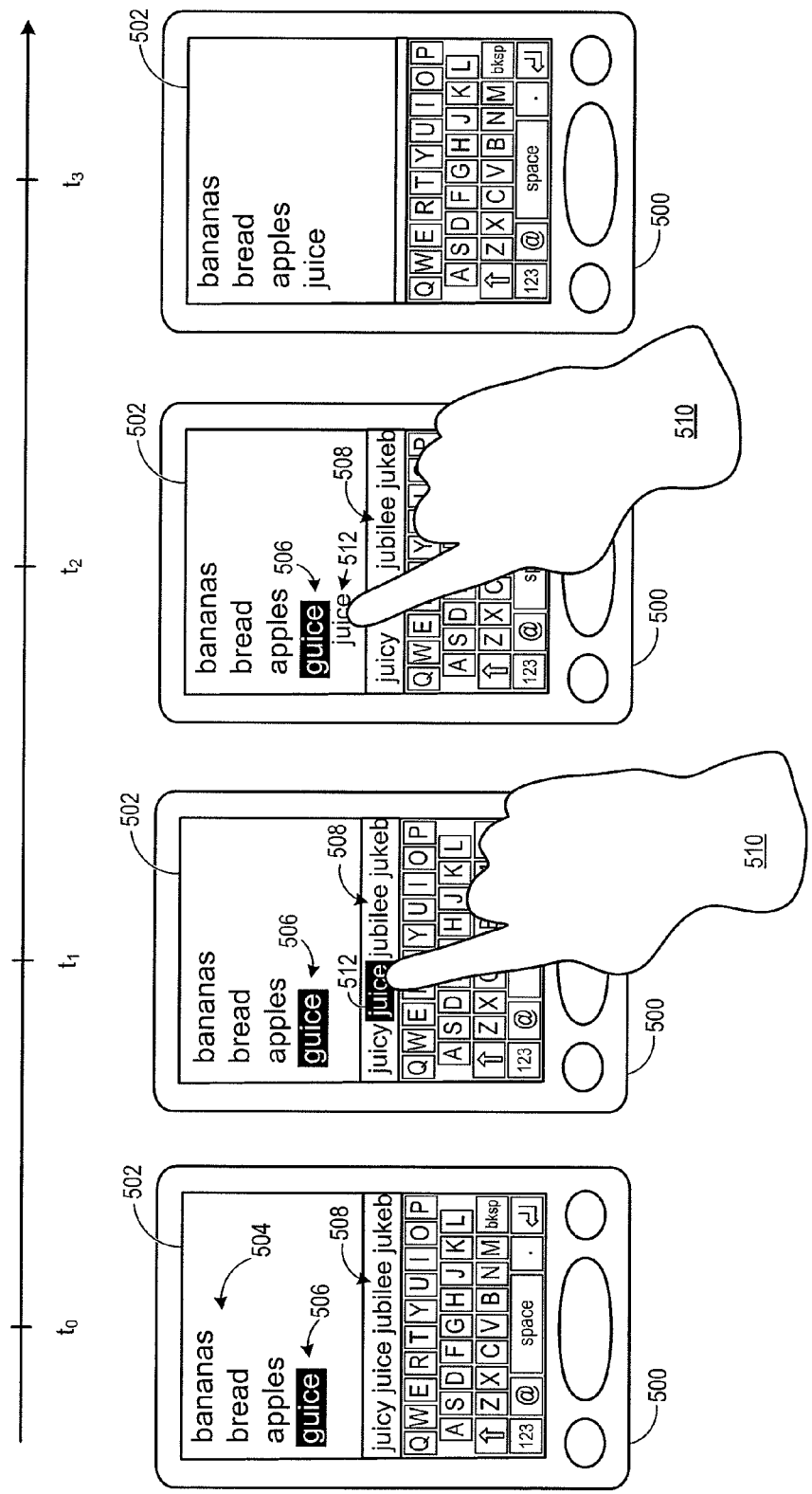
FIG. 5 shows another example time sequence of an embodiment of a method for correcting typographical errors displayed on a touch-sensitive display of a portable computing device.

FIG. 5 shows another example time sequence of correcting typographical errors displayed on a touch-sensitive display of a portable computing device according to an embodiment of the present disclosure. In the depicted embodiment, portable computing device 500 includes a touch-sensitive display 502 displaying text 504 including a misspelled word 506. At time to, misspelled word 506 is highlighted to visually indicate to the user that such a misspelling exists. Upon detecting the typographical error of misspelled word 506, portable computing device 500 has displayed on the display a candidate window 508 including one or more candidate words suggested for replacement of the typographical error. It is to be understood that candidate window 508 is shown for the purpose of example, and that candidate words may be visually presented on the display in any other suitable configuration such as a vertical list of words, a horizontal list of words, etc. in any other suitable location on the display.

At time $t_1$ of the depicted touch sequence, a user 510 performs a gesture-based touch input to select a candidate word 512 of "juice" from the candidate window 508. At subsequent time $t_2$, user 510 releases the gesture-based touch input at a location within a predefined region associated with the location of misspelled word 506. Accordingly, at time $t_3$, touch-sensitive display 502 displays a replacing of misspelled word 506 with candidate word 512.

Figure 6:
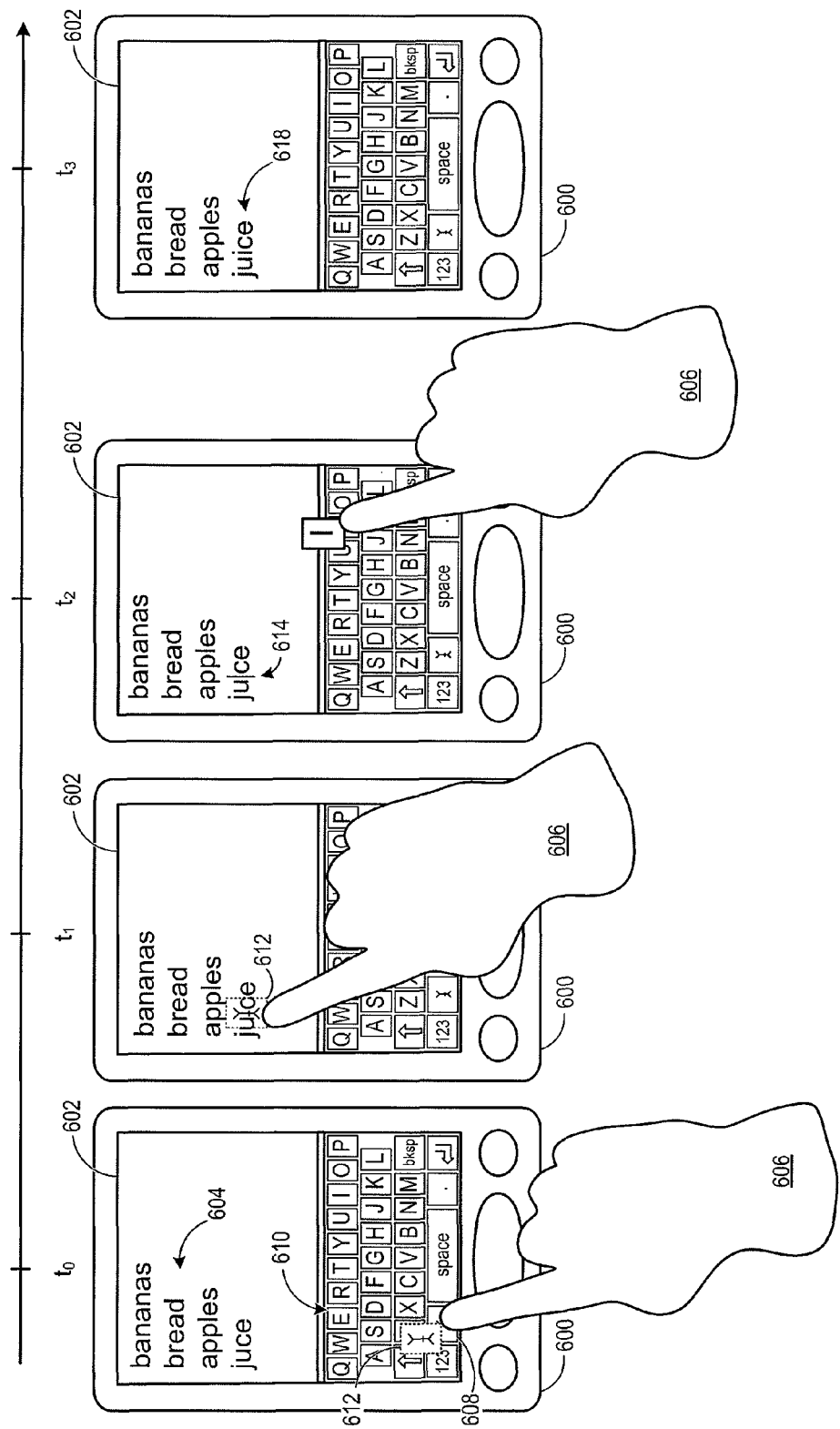
FIG. 6 shows an example time sequence of an embodiment of a method for correcting typographical errors displayed on a touch-sensitive display of a portable computing device via a cursor selected from a cursor key.

In some embodiments, correcting typographical errors displayed on a touch-sensitive display of a portable computing device may include detecting a gesture-based touch input selecting a cursor from a cursor key of a virtual keyboard displayed on the display. In such a case, the cursor may be configured for gesture-based drag-and-drop placement within text displayed on the display. As an example, FIG. 6 shows an example time sequence of utilizing such a cursor key according to an embodiment of the present disclosure. FIG. 6 shows a portable computing device 600 with a touch-sensitive display 602 displaying text 604. At time $t_0$, a user 606 selects the cursor key 608 of virtual keyboard 610. Such a selection may include a touch-and-hold gesture, yielding an image 612 of a cursor to be displayed on touch-sensitive display 602. As described above with reference to the image of the text replacement, image 612 of a cursor may be configured to move in correspondence with the touch gesture. Text 604 includes a typographical error, namely the text "juce." In this embodiment, the typographical error is not highlighted. However, it is to be understood that such an error may be highlighted as described above to visually indicate to the user that an error exists. At time $t_1$, user 606 releases the touch gesture between the letters "u" and "c" of the text "juce." Such releasing of the gesture yields placement of a cursor 614 at that location, as depicted at time $t_2$. As further depicted at time $t_2$, user 606 may perform another touch gesture to select a letter "i" for drag-and-drop placement at the location of cursor 614. Accordingly, upon releasing this second touch gesture at the location of cursor 614, touch-sensitive display 602 displays an insertion of the letter "i" at the location of cursor 614, as depicted at 618 at time $t_3$.

Figure 7:
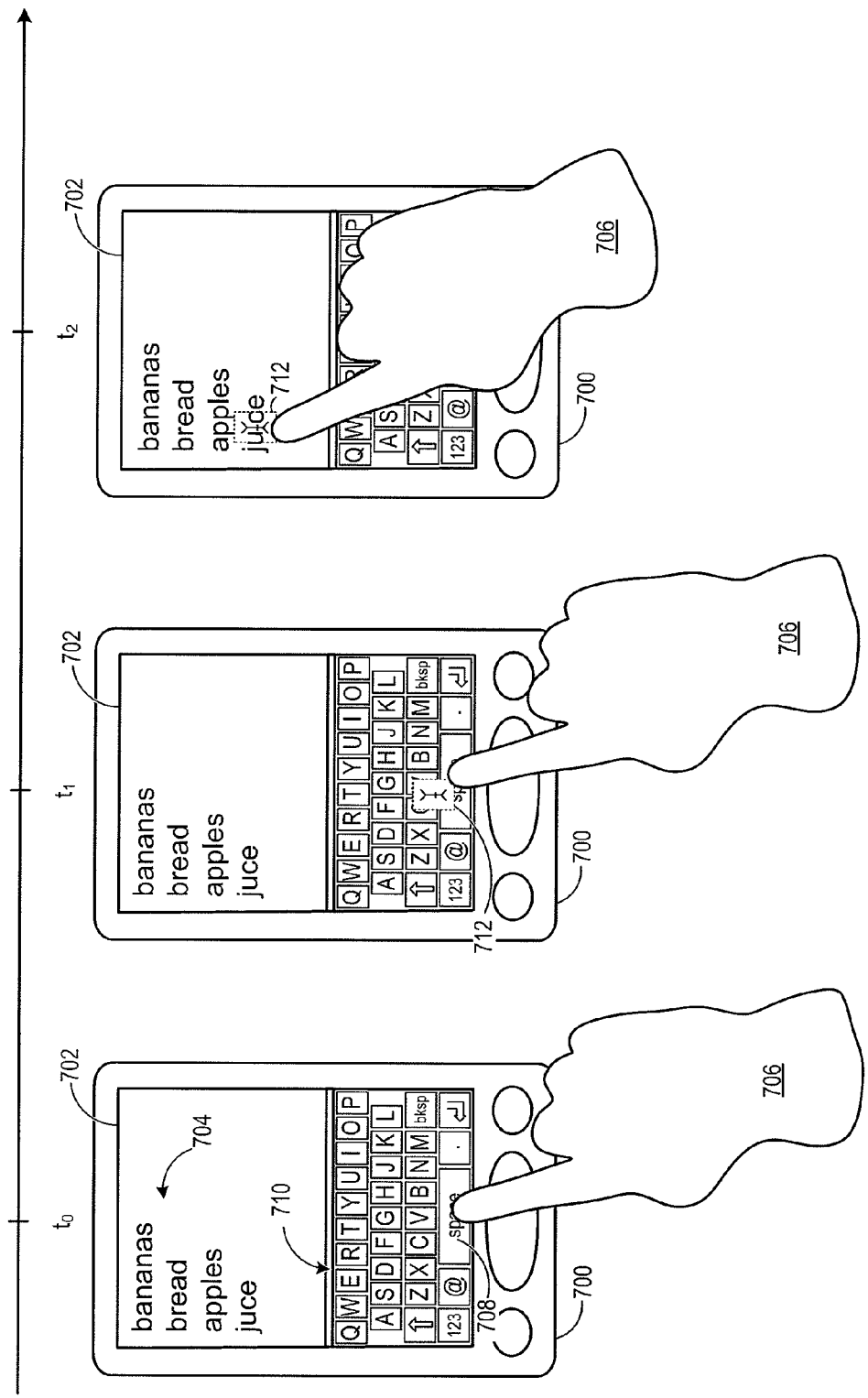
FIG. 7 shows an example time sequence of an embodiment of a method for correcting typographical errors displayed on a touch-sensitive display of a portable computing device via a cursor selected by a touch gesture.

In some embodiments, selection of such a cursor may include performing a touch gesture on a traditional key of a virtual keyboard, for example, the spacebar. In such cases, a user is afforded the benefits of cursor drag-and-drop placement as described above with reference to FIG. 6, without having a specific cursor key on the virtual keyboard. FIG. 7 shows an example time sequence illustrating such a case according to an embodiment of the present disclosure. FIG. 7 shows a portable computing device 700 with a touch-sensitive display 702 displaying text 704. At time to, a user 706 performs a touch gesture, e.g. a touch-and-hold gesture, at the spacebar key 708 of virtual keyboard 710. Such a gesture yields an image 712 of a cursor, as shown at time $t_1$ of the depicted touch sequence. At time $t_2$, user 706 releases the touch gesture between the letters "u" and "c" of the text "juce," thus positioning a cursor at that location.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method of correcting typographical errors displayed on a touch-sensitive display of a portable computing device, the method comprising:

identifying a typographical error within text displayed on the display, the typographical error comprising an error within a word displayed on the display;

upon identifying the typographical error, highlighting on the display the typographical error;

detecting a gesture-based touch input selecting a cursor key from a virtual keyboard displayed on the display and displaying a cursor in response to the gesture-based touch input;

detecting a change in a location of the gesture-based touch input, and in response, moving a location of an image of the cursor displayed on the display in correspondence with the gesture-based touch input;

detecting a release of the gesture-based touch input;

if the release of the gesture-based touch input is detected within a predefined region associated with a location of the typographical error, displaying on the display the cursor next to the typographical error; and responsive to the cursor being displayed next to the typographical error, replacing the typographical error with replacement text input from the virtual keyboard.

2. The method of claim 1, wherein the typographical error further comprises a single letter.

3. The method of claim 2, wherein highlighting on the display the typographical error comprises highlighting the single letter.

4. The method of claim 1, wherein highlighting on the display the typographical error comprises highlighting the word.

5. The method of claim 1, wherein detecting the gesture-based touch input selecting the cursor key from the virtual keyboard comprises receiving a touch input over the cursor key and detecting a movement of the touch input on the display.

6. The method of claim 1, further comprising, if the release of the gesture-based touch input is detected outside of the predefined region associated with the location of the typographical error, removing the image of the cursor from the display.

7. A method of correcting typographical errors displayed on a touch-sensitive display of a mobile computing device, the method comprising:

identifying a typographical error within text displayed on the display, the typographical error comprising a misspelled word displayed on the display;

upon identifying the typographical error, highlighting on the display the typographical error;

detecting a gesture-based touch input selecting a traditional key from a virtual keyboard displayed on the display;

displaying an image of a cursor on the display over the virtual keyboard in response to the gesture-based touch input;

detecting a change in a location of the gesture-based touch input, and in response, moving a location of the image of the cursor displayed on the display in correspondence with the gesture-based touch input;

detecting a release of the gesture-based touch input; and if the release of the gesture-based touch input is detected within a predefined region associated with a location of the typographical error, displaying on the display the cursor next to the typographical error; and responsive to the cursor being displayed next to the typographical error, replacing the typographical error with replacement text input from the virtual keyboard.

8. The method of claim 7, wherein selecting the traditional key comprises selecting a space bar key.

9. The method of claim 1, wherein selecting the cursor key further comprises selecting a dedicated cursor key.

10. The method of claim 1, wherein selecting the cursor key further comprises selecting a traditional key from the virtual keyboard.

11. A computing device, comprising:
a touch-sensitive display;
a logic subsystem; and
a memory including instructions executable by the logic subsystem to:
identify a typographical error within text displayed on the display, the typographical error comprising an error within a word displayed on the display;
upon identifying the typographical error, highlight on the display the typographical error;
detect a gesture-based touch input selecting a cursor key from a virtual keyboard displayed on the display and displaying a cursor in response to the gesture-based touch input;
detect a change in a location of the gesture-based touch input, and in response, move a location of an image of the cursor displayed on the display in correspondence with the gesture-based touch input;
detect a release of the gesture-based touch input;
if the release of the gesture-based touch input is detected within a predefined region associated with a location of the typographical error, display on the display the cursor next to the typographical error; and
responsive to the cursor being displayed next to the typographical error, replace the typographical error with replacement text input from the virtual keyboard.

12. The computing device of claim 11, wherein the typographical error further comprises a single letter.

13. The computing device of claim 12, wherein the instructions are executable to highlight the single letter typographical error.

14. The computing device of claim 11, wherein the instructions are executable to highlight the word.

15. The computing device of claim 11, wherein the instructions are executable to, when detecting the gesture-based touch input selecting the cursor key from the virtual keyboard, receive a touch input over the cursor key and detect a movement of the touch input on the display.

16. The computing device of claim 11, wherein the instructions are executable to, if the release of the gesture-based touch input is detected outside of the predefined region associated with the location of the typographical error, remove the image of the cursor from the display.

17. The computing device of claim 11, wherein selecting the cursor key comprises a dedicated cursor key.

18. The computing device of claim 11, wherein the cursor key comprises a traditional key from the virtual keyboard.

* * * * *